United States Patent Office

2,930,745
Patented Mar. 29, 1960

2,930,745

URANIUM REACTOR FUEL ELEMENT AND PROCESS

Benjamin George Weil, Annapolis, and Jerome Gilbert Morse, Baltimore, Md., assignors to The Martin Company, Middle River, Md., a corporation of Maryland No Drawing. Application February 21, 1957
Serial No. 641,465

10 Claims. (Cl. 204—193.2)

This invention relates to nuclear reactors, and has for its object the provision of improved nuclear reactor compositions, especially uranium fuel compositions, uranium fuel elements comprising the compositions, and a process of producing them. The improved uranium fuel compositions of our invention comprise a solution of an organic compound of uranium, advantageously an organic compound the organic portion of which has the required molecular weight, with a polymerizable compound. The organic compound may be dissolved in a polymerizable monomer or in an organic solvent in which is also dissolved a polymeric compound, said monomer and polymer being polymerizable to a semi-solid or solid state as a result of exposure to radiation. Although the compositions may be formed of natural uranium containing its fissionable isotopes, they are preferably formed of fully enriched uranium. They may also contain suitable proportions of finely divided aluminum or zirconium which facilitate the dissipation of heat generated by the fission reaction. The compositions as initially formed are solutions containing an organic compound which can be set to a solid resin on exposure to radiation, and the requisite quantity of an organic compound of uranium.

In one of its embodiments the invention provides fuel elements especially suitable for use as research reactors in the form of plastic rods containing the nuclear reactor composition which is a fissionable material. The uranium fuel elements preferably comprise concentric metal tubes closed at one end and having an annular space containing the liquid uranium fuel composition.

In accordance with the process of our invention, the uranium fuel composition is formed by dissolving solid, preferably a dry uranium compound, in either a polymerizable organic compound, or in an organic solvent in which is also dissolved a polymeric compound, producing an homogeneous system in which the uranium compound is dispersed uniformly and permanently. The polymerizable compound or polymer, as the case may be, is one that forms a sort of matrix for holding the uranium in a uniformly dispersed state and, as a result of the radiation, polymerizes to a hard or solid state, eventually becoming decomposed, without the liberation of objectionable amounts of gas. The organic uranium compound may be a chelate or an organic salt and is dried and preferably pulverized before dissolving in the organic solvent to form the composition.

The uranium chelate may be formed by reacting a uranium cation in aqueous solution, for example, a cation as resulting from the solutions of a uranyl salt, such as uranyl sulfate in a slightly acid medium, for example, an aqueous solution of sulfuric acid, with a suitable organic chelating agent. Suitable compounds for forming the uranium chelate compound include acetylacetone, cupferron, thionyltrifluoroacetone, sulfosalicylate, and 8-hydroxyquinoline. We prefer to use uranyl compounds which are formed from uranium which is enriched in its fissionable isotopes in the form of the sulfate, phosphate or nitrate salt, and to form a highly concentrated solution thereof in water, made slightly acid (pH just less than 7) with the corresponding acid. In precipitating the uranium chelate with the chelating agent, we may use, in the case of 8-hydroxy-quinoline, about 2½ moles of this agent to one molar solution of the uranium salt. These substances are intermixed at prevailing temperatures and pressures. Another suitable organic compound can be formed by reacting uranyl hydroxide $UO_2(OH)_2$ with an organic acid, having a molecular weight above 60, such as benzoic acid. The precipitated uranium compound is filtered, washed and dried at approximately 100° C.

The dry organic compound is dissolved in any suitable organic solvent, such as styrene, or in a solvent in which is also dissolved a polymer having a low state of polymerization. We prefer to use about two parts of the uranium compound by weight for each part of solution. The resin and/or solvent are selected to provide a solution of the uranium compound in a polymerizable compound which has the property of polymerizing from the monomer or of undergoing further polymerization as a result of the radiation emanating from the fissionable material to form a solid or semi-solid resin. Polymers in a low or partial state of polymerization which may be used in our composition to provide the resin portion comprise the polyesters including acrylics, methacrylates and alkyds, and the vinylics including: styrene, methyl styrene, and vinyl chloride, vinyl acetate and their copolymers. The foregoing polymers which are only partially set or cured are soluble in various solvents including styrene.

In that aspect of the invention in which a finely divided metal is used, aluminum or zirconium, the particle sizes vary from 5 to 50 microns, and the metal is used in an amount varying from 1 to 10 percent by weight based on the weight of the composition.

The uranium fuel composition, with or without the metal powder, may be stored in any suitable containers such as tinted glass bottles for considerable periods providing the amount does not exceed a critical mass in which case there would be an undesirable liberation of energy and the production of poisonous radioactive matter. This composition may be poured into the annular space within the metal tubes at any time to form the plastic fuel elements which are advantageously suitable for use as research reactors.

The metal tubes can be formed of stainless steel, zirconium or aluminum. The commercially available drawn aluminum tubes are especially advantageous. The tubes may be of any desired length, say, about 2 feet long and have one end closed. The tubes may have a wall thickness of about 0.05 inch. The outer tube may have an inner diameter of about 0.5 inch and the inner tube an outer diameter of 0.3 inch. When the inner tube is inserted into the outer tube in coaxial position there is an annular or cylindrical space of about 0.1 inch in width extending the length of the tubes. Into this space the fluid composition of nuclear fuel is poured and the resulting combination becomes a fuel element for a nuclear reactor employing the liberation of energy produced by the continuous fission of atoms of uranium.

This liberation of energy is dependent upon the type of fissionable matter contained in the composition, its amount of mass and its physical shape in cooperation with the type of moderator employed. For example, highly enriched uranium could be used in a water moderated swimming pool type reactor. Natural uranium could be used in a deuterium oxide (heavy water) moderated reactor. In the embodiment of the invention in which powdered metal is dispersed, the metal serves as a thermal conductor to facilitate dissipation of the internally generated heat.

When the reactor fuel elements are suitably proportioned, the liberation of neutrons and gamma radiation is such that the resin-forming material is cured to a hard state and ultimately becomes decomposed. If the tubes are arranged in a lattice configuration to provide a critical mass in association with a moderator and control means a controlled nuclear reaction will take place with consequent liberation of energy.

The nuclear reactor fuel elements of the invention are inexpensive, and easy to produce. The fuel elements have application for medical and other research uses, and provide a simple means of performing critical experiments which are done to prove the design of power reactors.

We claim:

1. The composition for forming a uranium reactor fuel element comprising in solution a uranium organic compound from the group consisting of uranyl acetylacetone, uranyl cupferron, uranyl thionyltrifluoroacetone, uranyl sulfosalicylate, uranyl 8-hydroxyquinoline, and uranium compounds formed by the reaction of uranyl hydroxide with an organic acid having a molecular weight above 60 and a polymerizable compound from the group consisting of acrylics, methacrylates, alkyds, styrene, methyl styrene, vinyl chloride, vinyl acetate and their copolymers, said composition being in an isolated amount less than its critical mass.

2. The composition as defined in claim 1 having a finely divided metal of the group consisting of aluminum and zirconium dispersed in the solution.

3. A uranium fuel element which comprises coaxial metal tubes of such dimensions that an annular space is formed within the tubes, and a composition in the annular space comprising a uranium organic compound from the group consisting of uranyl acetylacetone, uranyl cupferron, uranyl thionyltrifluoroacetone, uranyl sulfosalicylate, uranyl 8-hydroxyquinoline, and uranium compounds formed by the reaction of uranyl hydroxide with an organic acid having a molecular weight above 60 and a polymerizable compound from the group consisting of acrylics, methacrylates, alkyds, styrene, methyl styrene, vinyl chloride, vinyl acetate and their copolymers, said polymerizable compound being in an incompletely polymerized state and holding the uranium organic compound in a dispersed state, said polymerizable compound further being one which will polymerize to at least a semi-solid state on exposure to radiation from the fissionable uranium.

4. A uranium fuel element as defined in claim 3 having a finely divided metal of the group consisting of aluminum and zirconium dispersed in the solution.

5. A uranium fuel element as defined in claim 4 in which the metal particles vary in size from 5 to 50 microns and comprise from 1 to 10 percent of the weight of the composition.

6. A uranium fuel element as defined in claim 3 in which the uranium organic compound is in solution in styrene.

7. The process of forming a composition for use as a fuel element in research reactor which comprises forming a solution of a uranium chelate compound from the group consisting of uranyl acetylacetone, uranyl cupferron, uranyl thionyltrifluoroacetone, uranyl sulfosalicylate, uranyl 8-hydroxyquinoline, and uranium compounds formed by the reaction of uranyl hydroxide with an organic acid having a molecular weight above 60 and a resin-forming compound from the group consisting of acrylics, methacrylates, alkyds, styrene, methyl styrene, vinyl chloride, vinyl acetate and their copolymers.

8. The process of forming a composition for use as a fuel element in research reactors which comprises reacting together in an acid aqueous solution a uranium cation and an organic chelating compound from the group consisting of acetylacetone, cupferron, thionyltrifluoroacetone, sulfosalicylate, and 8-hydroxyquinoline to form and precipitate a uranium chelate compound, and forming a solution of the uranium chelate compound and a resin-forming compound from the group consisting of acrylics, methacrylates, alkyds, styrene, methyl styrene, vinyl chloride, vinyl acetate and their copolymers, said resin-forming compound being curable to a solid mass by action of the radiation produced by the nuclear chain reaction occurring in said reactor.

9. In the process of claim 8, dispersing in the solution a finely-divided metal of the group consisting of aluminum and zirconium.

10. In the process of claim 8, dissolving the uranium chelate compound in styrene.

References Cited in the file of this patent

UNITED STATES PATENTS

| | | |
|---|---|---|
| 2,559,259 | Raper | July 3, 1951 |
| 2,824,784 | Hansen et al. | Feb. 15, 1958 |

OTHER REFERENCES

Fabrication of Teflon Critical-Experiment Fuel Elements, by Swanson and Welch, August 1956; available from Office of Technical Services, U.S. Dept. of Commerce.